(12) United States Patent
Yuan et al.

(10) Patent No.: US 11,595,087 B2
(45) Date of Patent: Feb. 28, 2023

(54) METHODS AND DEVICES FOR CHANNEL STATE INFORMATION TRANSMISSION (71) Applicant: NEC CORPORATION, Tokyo (JP)

(72) Inventors: Fang Yuan, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 78 days.

(21) Appl. No.: 17/254,630

(22) PCT Filed: Jun. 22, 2018

(86) PCT No.: PCT/CN2018/092511
§ 371 (c)(1),
(2) Date: Dec. 21, 2020

(87) PCT Pub. No.: WO2019/242025
PCT Pub. Date: Dec. 26, 2019

(65) Prior Publication Data
US 2021/0126679 A1    Apr. 29, 2021

(51) Int. Cl.
*H04W 72/02* (2009.01)
*H04B 7/0417* (2017.01)
(Continued)

(52) U.S. Cl.
CPC ......... *H04B 7/0417* (2013.01); *H04L 5/0057* (2013.01); *H04W 72/02* (2013.01); *H04W 72/044* (2013.01)

(58) Field of Classification Search
CPC .... H04B 7/0417; H04B 7/0626; H04B 7/063; H04B 7/0695; H04L 25/0224; H04L 5/001; H04L 5/0023; H04L 5/0057; H04L 5/006
See application file for complete search history.

(56) References Cited

U.S. PATENT DOCUMENTS

2016/0142117 A1    5/2016  Rahman et al.
2017/0048037 A1    2/2017  Yen et al.
(Continued)

FOREIGN PATENT DOCUMENTS

CN    106160807 A    11/2016
EP    3 337 274 A1    6/2018
(Continued)

OTHER PUBLICATIONS

Communication dated May 18, 2021 by the European Patent Office in application No. 18923413.1.
(Continued)

*Primary Examiner* — Phuc H Tran
(74) *Attorney, Agent, or Firm* — Sughrue Mion, PLLC (57) ABSTRACT

Embodiments of the present disclosure relate to methods and devices for channel state information (CSI) transmission. In example embodiments, a method implemented in a terminal device includes performing a channel estimate between the terminal device and a network device across a predetermined frequency range for a set of beams having different spatial directions; determining, based on the channel estimate, first indication information indicating at least one beam selected from the set of beams and second indication information indicating frequency-related information for the at least one selected beam at a plurality of frequency locations in the predetermined frequency range; and transmitting to the network device the first indication information in a first part of a channel state information (CSI) report and the second indication information in a second part of the CSI report.

17 Claims, 6 Drawing Sheets

(51) Int. Cl.
*H04L 5/00* (2006.01)
*H04W 72/044* (2023.01)

(56) References Cited

U.S. PATENT DOCUMENTS

| | | | |
|---|---|---|---|
| 2018/0254813 A1* | 9/2018 | Gao | H04B 7/0639 |
| 2019/0053220 A1* | 2/2019 | Zhang | H04B 7/0695 |

FOREIGN PATENT DOCUMENTS

| | | |
|---|---|---|
| WO | 2017/043883 A1 | 3/2000 |
| WO | 2017/050299 A1 | 3/2017 |
| WO | 2018029644 A2 | 2/2018 |
| WO | 2018030804 A1 | 2/2018 |

OTHER PUBLICATIONS

International search report for PCT/CN2018/092511 dated Feb. 27, 2019.
Written opinion for PCT/CN2018/092511 dated Feb. 27, 2019.
ZTE, Sanechips, "Remaining details on CSI reporting", 3GPP TSG RAN WG1 Meeting #92, Athens Greece, Feb. 26 to Mar. 2, 2018, R1-1801580, 6 pages.
Nokia, Nokia shanghai Bell, "Remaining details for Type I and Type II CSI reporting", 3GPP TSG RAN WG1 Meeting AH 1801, Vancouver, Canada, Jan. 22 to Jan. 26, 2018, R1-1800754, 6 pages.
ZTE, "Type II CSI feedback based on linear combination", 3GPP TSG RAN WG1 Meeting #88bis, Hangzhou, China, May 15 to May 19, 2017, R1-1707127, 15 pages.
Huawei, HiSilicon, "Structure of group-common PDCCH", 3GPP TSG RAN WG1 Meeting #89, Hangzhou, China, May 15 to May 19, 2017, R1-1708145, 3 pages.
Samsung et al., "WF on Type I and II CSI codebooks", 3GPP TSG-RAN WG1 #89, Hangzhou, China, May 15 to May 19, 2017, R1-1709232, 25 pages.
ZTE, Sanechips, "Remaining details on CSI reporting", 3GPP TSG RAN WG1 Meeting #90bis, Prague, Czech Republic, Oct. 9 to Oct. 13, 2017, R1-1717423, 6 pages.
Communication dated Jun. 28, 2022, issued in Japanese Application No. 2020-571360.

* cited by examiner

METHODS AND DEVICES FOR CHANNEL STATE INFORMATION TRANSMISSION

CROSS-REFERENCE TO RELATED APPLICATIONS

This application is a National Stage of International Application No. PCT/CN2018/092511 filed Jun. 22, 2018.

TECHNICAL FIELD

Embodiments of the present disclosure generally relate to the field of telecommunication, and in particular, to methods and devices for channel state information (CSI) transmission.

BACKGROUND

Communication technologies have been developed in various telecommunication standards to provide a common protocol that enables different wireless devices to communicate on a municipal, national, regional, and even global level. An example of an emerging telecommunication standard is new radio (NR), for example, 5G radio access.

NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. These improvements may be applicable to other multi-access technologies and the telecommunication standards that employ these technologies. For example, in the communication systems, generally Channel State Information (CSI) of a communication channel between a terminal device and a network device is estimated at the receiving terminal device and fed back to the network device to enable the network device to control transmission based on the current channel conditions indicated by the CSI. According to the NR technology, it has been proposed that channel properties for both wideband and subband and for different beams (in MIMO systems) are to be reported in the CSI, which results in a large overhead for the CSI transmission.

SUMMARY

In general, example embodiments of the present disclosure provide methods and devices for channel state information (CSI) transmission.

In a first aspect, there is provided a method implemented in a terminal device. The method comprises performing a channel estimate between the terminal device and a network device across a predetermined frequency range for a set of beams having different spatial directions; determining, based on the channel estimate, first indication information indicating at least one beam selected from the set of beams and second indication information indicating frequency-related information for the at least one selected beam at a plurality of frequency locations in the predetermined frequency range; and transmitting to the network device the first indication information in a first part of a channel state information (CSI) report and the second indication information in a second part of the CSI report.

In a second aspect, there is provided a method implemented in a terminal device. The method comprises performing a channel estimate between the terminal device and a network device across a predetermined frequency range for a set of beams having different spatial directions; determining, based on the channel estimate, indication information indicating at least one beam selected from a plurality of beams for a plurality of frequency locations in the predetermined frequency range; and transmitting to the network device the indication information in a first part of a channel state information (CSI) report.

In a third aspect, there is provided a method implemented in a network device.

The method comprises receiving from a terminal device a channel state information (CSI) report determined from a channel estimate, a first part of the CSI report at least comprising first indication information indicating at least one of a set of beams, and a second part of the CSI report at least comprising second indication information indicating a plurality of frequency locations in a predetermined frequency range for the at least one selected beam; and constructing CSI based on the first and second indication information to control transmission with the terminal device.

In a fourth aspect, there is provided a method implemented in a network device. The method comprises receiving from a terminal device a channel state information (CSI) report determined from a channel estimate, a first part of the CSI report at least comprising indication information indicating at least one beam selected from a plurality of beams for a plurality of frequency locations in a predetermined frequency range; and constructing CSI based on the first and second indication information to control transmission with the terminal device.

In a fifth aspect, there is provided a terminal device. The device includes a processor; and a memory coupled to the processing unit and storing instructions thereon, the instructions, when executed by the processing unit, causing the device to perform the method according to any of the first and second aspects.

In a sixth aspect, there is provided a network device. The device includes a processor; and a memory coupled to the processing unit and storing instructions thereon, the instructions, when executed by the processing unit, causing the device to perform the method according to any of the third and fourth aspects.

In a seventh aspect, there is provided a computer readable medium having instructions stored thereon, the instructions, when executed on at least one processor, causing the at least one processor to carry out the method according to any of the first and second aspects.

In an eighth aspect, there is provided a computer readable medium having instructions stored thereon, the instructions, when executed on at least one processor, causing the at least one processor to carry out the method according to any of the first and second aspects.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
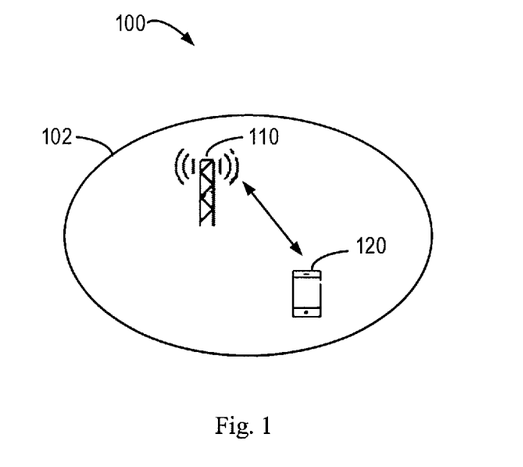
FIG. 1 is a block diagram of a communication environment in which embodiments of the present disclosure can be implemented.

FIG. 1 shows an example communication network 100 in which implementations of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing implementations of the present disclosure. Although not shown, it is to be understood that one or more terminal devices may be located in the cell 102 and served by the network device 110.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In communications, the terminal device 120 is configured to estimate and report channel state information (CSI) of a communication channel between the terminal device 120 and the network device 110. The CSI can be determined by the terminal device 120 using downlink reference signals transmitted by the network device 110.

Generally, LTE utilizes an implicit rank indicator/precoding matrix indicator/resource partitioning information/channel quality indicator (RI/PMI/RPI/CQI) feedback framework for the CSI feedback. The CSI feedback framework is "implicit" in the form of CQI/PMI/RI (and CRI in the LTE specification) derived from a codebook.

RI is information on a channel rank as described above and indicates the number of streams that can be received via the same time-frequency resource. Since RI is determined by long-term fading of a channel, it may be generally fed back at a cycle longer than that of PMI or CQI. PMI is a value indicating a spatial characteristic of a channel and indicates a precoding matrix index of the network device preferred by the terminal device. RPI is corresponding to power domain resource assignments between the serving network device 110 and one or more non-serving network devices. CQI is information indicating the strength of a channel and indicates a reception SINR obtainable when the network device uses PMI.

The CSI feedback reflects average channel conditions over the overall or part of system bandwidth. Some metrics, such as RI, PMI, and RPI, may be computed to reflect the average channel conditions across the system bandwidth (e.g., wideband RI/PMI). The PMI across the system bandwidth may indicate an index of a beam for the system bandwidth, and the RPI across the system bandwidth may indicate a gain of the beam across the system bandwidth. Some metrics, such as PMI and CQI, may be computed per subband. The PMI for a subband may indicate a gain of the beam in the subband, and the RPI for a subband may indicate a phase shift of the beam in the subband.

When the terminal device reports CSI for one beam, parameters defining the RI, PMI, RPI, and/or CQI may be determined by the terminal device based on the channel estimate. The parameters may be reported to the network device to identify a codeword from a codebook. The codebook defined for transmission using one beam may also be referred to as a type I codebook, where each codeword therein can be defined as below:

$$W_{l,m,n}^{(1)} = \frac{1}{\sqrt{P_{CSI-RS}}} \begin{bmatrix} v_{l,m} \\ \varphi_n v_{l,m} \end{bmatrix} \quad (1)$$

where $v_{l,m}$ indicates a vector for the specific beam; l and m are indices used to identify the beam, which are respectively corresponding to the horizontal and vertical directions of the beam because this beam is a three-dimensional (3D) beam; $\varphi_n$ is used to define a polarization factor for the beam, and where $$\varphi_n = e^{j2\pi n/2}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}, \text{ and}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T.$$

$N_1, N_2$, are used to indicate a dimension of an antenna array at the network device, $O_1$, and $O_2$ are configured numbers for oversampling the spatial directions.

To allow the network device to determine the codeword for the beam, parameters including l, m, and $\varphi_n$ are needed to be reported by the terminal device. Since CSI for only one beam is required, the overhead is limited.

In some other cases, the terminal device is configured to report CSI for more than one beam (for example, L beams). Information for the beams is required to determine the codeword from a codebook. The codeword in this case can be defined by the terminal device depending on information of different beams, for example as below:

$$W_{q_1,q_2,n_1,n_2,p_l^{(1)},p_l^{(2)},c_l}^l = \frac{1}{\sqrt{N_1 N_2 \sum_{i=0}^{2L-1} (p_{l,i}^{(1)} p_{l,i}^{(2)})^2}} \begin{bmatrix} \sum_{i=0}^{L-1} v_{m_1^{(i)},m_2^{(i)}} P_{l,i}^{(1)} P_{l,i}^{(2)} \varphi_{l,i} \\ \sum_{i=0}^{L-1} v_{m_1^{(i)},m_2^{(i)}} P_{l,i+L}^{(1)} P_{l,i+L}^{(2)} \varphi_{l,i+L} \end{bmatrix}, l = 1, 2 \quad (2)$$

where $v_{m_1^{(i)},m_2^{(i)}}$ represents a vector for a i-th beam; $m_1^{(i)}$ and $m_2^{(i)}$ are indices corresponding to the horizontal and vertical direction of the i-th beam and can be used to identify the i-th beam; $v_{m_1^{(i)},m_2^{(i)}}$ may be regarded as a PMI for the i-th beam across a system bandwidth (a wideband) in some examples; $p_{l,i}^{(1)}$ indicates a gain of the i-th beam across the system bandwidth, and $p_{l,i}^{(2)}$ indicates a gain of the i-th beam in a certain subband; $p_{l,i}^{(1)}$ and $p_{l,i}^{(2)}$ may be regarded as a RPI for the i-th beam across the system bandwidth and another PMI for the i-th beam in the certain subband; $\varphi_{l,i}$ represents a phase factor in the frequency domain for combining different beams. The codebook including a codeword such as in Equation (2) may be referred to as a type II codebook.

To allow the network device to determine the codeword, for each of the L beams, parameters including wideband information $m_1^{(i)}$, $m_2^{(i)}$, and $p_{l,i}^{(1)}$, and suband information $p_{l,i}^{(2)}$, and $\varphi_{l,i}$ are needed to be reported by the terminal device, which will increase the overhead for CSI transmissions. The total overhead for transmitting CSI is depending on the rank order and the number of beams to be reported. The following Table 1 shows the overhead for the CSI transmission in some cases.

TABLE 1

Type II CSI feedback overhead (in bits) for a single panel

| Parameters | RI (WB) | | | PMI1 (WB) | RPI (WB) | Total (WB) | PMI2 (SB) | RPI (SB) | CQI (SB) | Total (WB + SB) |
|---|---|---|---|---|---|---|---|---|---|---|
| $(N_1, N_2) =$ | 1 | RI = | L = 2 | 13 | 9 | 23 | 9 | 3 | 4 | 183 |
| (4, 4) | | 1 | L = 3 | 17 | 15 | 33 | 13 | 3 | | 233 |
| $(O_1, O_2) =$ | | | L = 4 | 18 | 21 | 40 | 19 | 5 | | 320 |
| (4, 4) | | RI = | L = 2 | 15 | 18 | 34 | 18 | 6 | | 314 |
| | | 2 | L = 3 | 20 | 30 | 51 | 26 | 6 | | 411 |
| | | | L = 4 | 21 | 42 | 64 | 38 | 10 | | 584 |

As can be seen from Table 1, the overhead for the CSI feedback is large and sometimes is about 600 bits. In addition if the system bandwidth is wide, the CSI feedback for each of a plurality of subbands in the system bandwidth is to be transmitted, which will further increase the overhead as the number of the subbands increase. Therefore, there is a need to compress the overhead for the CSI transmission.

There have been some solutions for CSI compression. According to one solution, a terminal device transmits CSI at some of frequency locations in the frequency domain. Upon reception of the CSI feedback, the network device determines the CSI at other frequency locations by interpolating the CSI received at some of the frequency locations. In this way, CSI at all the frequency locations can be determined while the overall overhead for CSI transmission can be reduced. However, the CSI overhead is still large and will also increase as the system bandwidth increases or the number of subbands increases.

According to embodiments of the present disclosure, there is prosed a solution for CSI transmission. In this solution, indication information related to a frequency domain is determined and included in a CSI report by a terminal device. The frequency-related indication information along with other indication information related to a beam in a spatial domain can be used to construct CSI by a network device.

Principle and implementations of the present disclosure will be described in detail below with reference to FIG. 2, which shows a process 200 for UCI transmission according to an implementation of the present disclosure. For the purpose of discussion, the process 200 will be described with reference to FIG. 1. The process 200 may involve the network device 110 and the terminal device 120 in FIG. 1.

The terminal device 120 performs (205), a channel estimate between the terminal device 120 and the network device 110 across a predetermined frequency range for a set of beams having different spatial directions. Various procedures can be utilized for the terminal device 120 to perform the channel estimate. Typically, the terminal device 120 may receive a reference signal from the network device 110. The reference signal may be any signal sequence that is known by both the terminal device 120 and the network device 110. By comparing the received reference signal and the true reference signal, the terminal device 120 may estimate channel conditions between the terminal device 120 and the network device 110.

The terminal device 120 determines (210), based on the channel estimate, first indication information indicating at least one beam selected from the set of beams and second indication information indicating frequency-related information for the at least one selected beam at a plurality of frequency locations in the predetermined frequency range. Depending on the channel estimate, the terminal device 120 selects a predetermined number of beams from a set of beams to report to the network device. Each of the selected beam(s) can be indicated with corresponding indices, for example, indices related to the horizontal and vertical directions.

According to embodiments of the present disclosure, additional indication information (i.e., the second indication information) in the frequency domain is determined for CSI feedback. The frequency range has a system bandwidth of the network 100, and thus may be referred to as a wideband. For each selected beam, the corresponding frequency-related information is indicated in the second indication information. In some embodiments, with the frequency-related information, a codeword for CSI can be extended from Equation (2) as below:

$$\tilde{W}^l_{q_1,q_2,n_1,n_2,p_l^{(1)},p_l^{(2)},c_l} = H\left(W^l_{q_1,q_2,n_1,n_2,p_l^{(1)},p_l^{(2)},c_l}, f_i\right) = \frac{1}{\sqrt{N_1 N_2 \sum_{k=0}^{2L-1} \left(p_{l,i}^{(1)} p_{l,i}^{(2)}\right)^2}} \begin{bmatrix} \sum_{i=0}^{L-1} v_{m_1^{(l)},m_2^{(l)}} \otimes f_i P_{l,i}^{(1)} P_{l,i}^{(2)} \varphi_{l,i} \\ \sum_{i=0}^{L-1} v_{m_1^{(l)},m_2^{(l)}} \otimes f_i P_{l,i}^{(1)} P_{l,i+L}^{(2)} \varphi_{l,i+L} \end{bmatrix}, l = 1, 2 \quad (3)$$

where $f_i$ represents the frequency-related information for the i-th selected beam, L represents the number of selected beams, $\varphi_{l,i}$ represents a co-phase shift factor in time domain for combining different beams, $p_{l,i}^{(1)}$ and $p_{l,i}^{(2)}$ represents the gain of the i-th beam in time domain.

In some embodiments, the second indication information may be indicated using the result of time-to-frequency domain transformation performed at the terminal device 120. For example, the second indication information may be indicated using an element selected from a resulting matrix of a Fast Fourier Transformation (FFT) or a Discrete Fourier Transformation (DFT), which is usually performed at the terminal device 120, especially in an OFDM network. In the DFT matrix, each of the rows is corresponding to a subcarrier, and each of the columns is corresponding to a delay value in a time domain of a channel path that is associated with a certain selected beam. Therefore, elements in a certain row and a certain column in the DFT matrix can be used as the frequency-related information for CSI feedback.

An example DFT matrix is provided as below:

$$f_i \stackrel{\Delta}{\rightarrow} DFT = \begin{bmatrix} \cdots \\ D_{s_k,i} \\ \vdots \ D_{s_{k+1},i} \ \vdots \\ D_{s_{k+2},i} \\ \cdots \end{bmatrix} \quad (4)$$

where $$D_{s_k,i} = e^{(j2\pi s)_k \tau_i}, \; s_k = -\frac{f(SB_k, \text{offset})}{N},$$

and $\tau_i$=0, N−1. In Equation (4), N is related to the size of the DFT matrix (i.e., a size of N*N); $\tau_i$ represents a delay value associated with the i-th beam in a time domain and may be normalized to a value in a range from 0 to N−1; $s_k$ and i are the row and column indices for an element in the DFT matrix, respectively; $SB_k$ represents the k-th subband; $SB_k$ and offset are used to determine the row index which is corresponding to a certain subcarrier in a subband; and offset may be an index of a center subcarrier in the subband (the subband may be divided into one or more subcarriers) or an index of a non-center subcarrier but is a preconfigured parameter offset for defining a certain subcarrier in a subband.

In some embodiments, the frequency-related information $f_i$ for the i-th beam may be a vector including elements corresponding to a plurality of frequency locations (such as the frequency locations of different subbands in a certain frequency range). The length of the vector for the frequency-related information $f_i$ depends on the number of the frequency locations (for example, subbands), which may be configured by the network device 110. For example, the network device 110 may notify the terminal device 120 that frequency-related information for S subbands is required to be reported and thus the frequency-related information $f_i$ has a length of S. The k-th element in the vector for frequency-related information $f_i$ may be represented as $D_{s_k,i}$.

In some embodiments, since the DFT matrix can be obtained at the network device 110 and the subbands that are considered are also configured by the network device 110, the terminal device 120 may determine only the delay value associated with the selected beam ($\tau_i$ for the path associated with the i-th beam) as the second indication information. In these embodiments, the frequency-related information for each selected beam can be indicated by a combination of the associated delay value and predefined indices of the plurality of frequency locations (for example,$s_k$).

Figure 3:
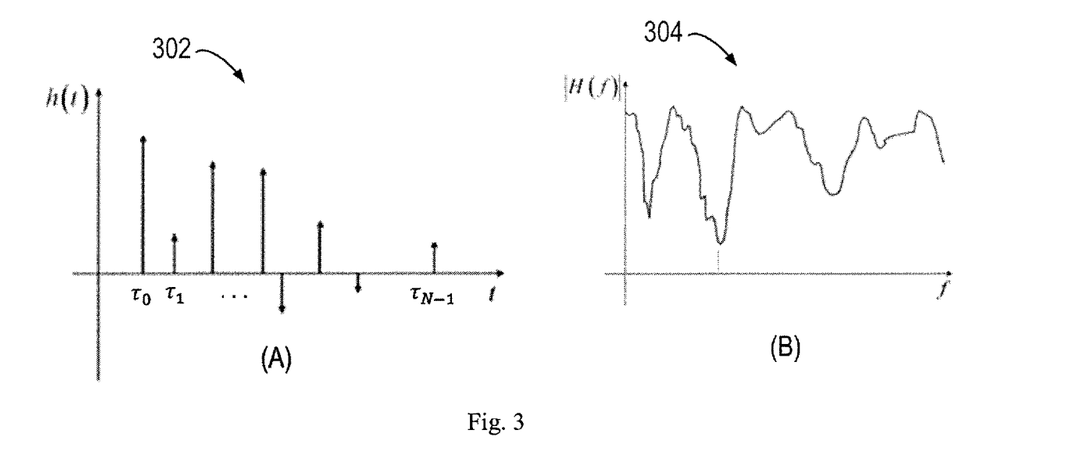
FIGS. 3A-3B illustrate graphs of time-domain and frequency-domain responses of beams according to some other embodiments of the present disclosure.

FIGS. 3A-3B illustrate graphs 302 and 304 for a time-domain response and a frequency-domain response, respectively. The graph 302 for the time-domain responses of all the beams may be determined as $h(t)=\Sigma_{i=0}^{L-1} p_{l,i}^{(1)} p_{l,i}^{(2)} \varphi_{l,i} \delta(t-\tau_i)$, where $p_{l,i}^{(1)} p_{l,i}^{(2)}$ represents a gain of the i-th beam, and $\varphi_{l,i}$ represents a co-phase shift factor for the i-th beam in the time domain applied across a plurality of frequency locations. The graph 304 for the frequency-domain response for the i-th beam may be determine as $$H(i,l) = \sum_{k=0}^{N-1} P_{l,i}^{(1)} P_{l,i}^{(2)} e^{-(j2\pi s)_k \tau_i}.$$

In some embodiments, instead of using the range from 0 to N−1, a value range of the delay value r may also be configured, for example, via radio resource control (RRC) signaling or activated by a media access control (MAC)-control element (CE). In some other embodiments, the range of the delay value $\tau_i$ is determined by a length of a cyclic prefix and/or the numerology used in the network 100.

In some embodiments, except the second indication information, other information in the CSI report is reused from the conventional CSI feedback framework. For example, the first indication information indicating the selected beam(s) may be represented by the indices of the horizontal and vertical directions of the selected beam(s) to indicate $v_{m_1^{(i)}, m_2^{(i)}}$, which may be regarded as, for example, a wide-band PMI. In some embodiments, the terminal device 120 may determine, based on the channel estimate, third indication information indicating a gain for the at least one selected beam across the frequency range. For example, the third indication information may be a wideband RPI indicating a gain of a beam (such as $p_{l,i}^{(1)}$, The terminal device 120 may further determine, based on the channel estimate, fourth indication information indicating a respective co-phasing shift in the time domain for the at least one selected beam applied across the predetermined frequency range (such as The fourth indication information may be regarded as wideband information.

Referring back to FIG. 2, the terminal device 120 transmits (215) the first indication information in a first part of a CSI report and the second indication information in a second part of the CSI report. A CSI report typically includes two parts, the first part (also referred to as part 1) and the second part (also referred to as part 2). The first part may be transmitted by the terminal device 120 to the network device 110 before the second part. The two parts may be encoded independently. The indication information indicating the selected beam(s) by the terminal device 120 is generally in the first part such that the network device 110 can first decode the first part to determine which beam(s) are to be expected.

In embodiments where the third and fourth indication information is determined, the terminal device 120 may also include the determined information in the second part of the CSI report to be transmitted to the network device 110. Upon reception of the first and second parts of the CSI report, the network device 110 constructs (220) CSI based on the received indication information. For example, the network device 110 determines a codeword from a CSI codebook based on the received indication information to control transmission with the terminal device 120.

In some embodiments, a gain of a beam in each subband is not determined or included in the CSI report. The CSI report may mainly include the first indication information indicating the selected beam(s) (for example, $v_{m_1^{(i)}, m_2^{(i)}}$, the second indication information (the delay value $\tau_i$) for each selected beam, the third indication information across the frequency range ($p_{l,i}^{(1)}$), and the fourth indication information indicating a co-phasing shift in the time domain applied across the whole frequency range ($\varphi_{l,i}$). That is to say, the gains of each selected beam and co-phasing shifts are reported in the time domain, and thus not reported independently for each subband at respective frequency locations in the CSI report, which may help reduce the overhead for the report transmission.

In some embodiments, the CSI report may further comprise further indication information indicating a channel quality indicator (CQI) corresponding to the frequency range. The CQI may be included in the first part of the report.

Figure 4:
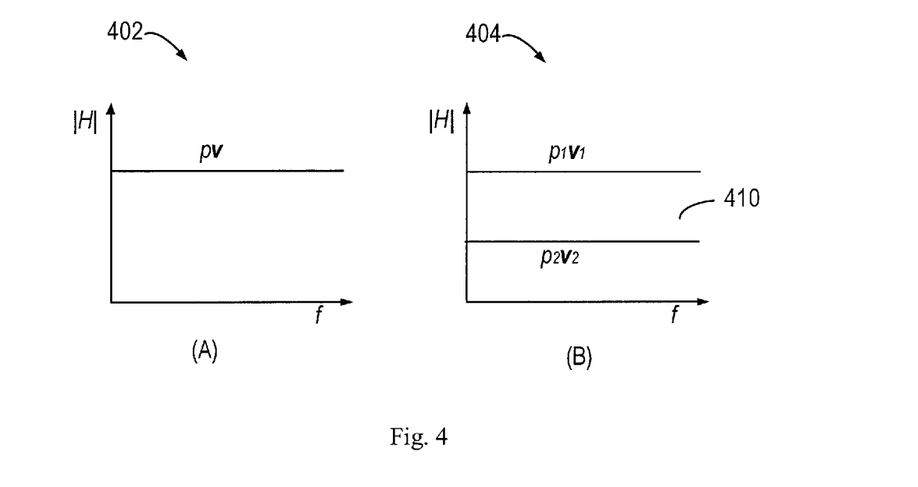
FIGS. 4A-4B illustrate graphs of frequency-domain responses of beams according to some other embodiments of the present disclosure.

In these embodiments, upon reception of the indication information, to construct the CSI, the network device 110 may determine, based on the received indication information, a codeword from a codebook configured for the CSI. The codeword may be determined, for example, according to the above Equation (3). The codeword may be determined for each of the subcarriers (the frequency locations). If there is only one beam in the communication channel, the beam indicated by $v_{m_1^{(i)}, m_2^{(i)}}$ is the same for all the frequency locations, the gain of the beam across the frequency range is the same for all the frequency locations, and the co-phasing shifts in the time domain is also the same for all the frequency locations across the system bandwidth. The component phase information in a subcarrier $s_k$ is determined as $\varphi_{l,i}\, e^{-j2\pi s_k \tau_i}$, which is determined by the co-phasing shift in the time domain and the delay value. In this case, the frequency-domain response of a single beam in all the frequency range remains unchanged, as shown in graph 402 in FIGS. 4A-4B.

In some embodiments, if there are more than two beams selected, gains for each selected beam at the frequency locations may be determined by weighting the second, third, and fourth indication information of the respective selected beams. For example, if there are two selected beams, the second indication information may include delay values $\tau_1$ and $\tau_2$ for the two beams, the third indication information may include gains $p_1$ and $p_2$ for the two beams applied across the frequency range, and the fourth indication information may include co-phasing shifts $\varphi_1$, and $\varphi_2$ in the time domain for the two beams applied at different frequency locations. The gains of the two beams at the respective frequency locations f may then be determined as $p_1\, v_1 \varphi_1\, e^{j2\pi f \tau_1} + p_2\, v_2\, \varphi_2\, e^{j2\pi f \tau_2}$, as denoted as curve 410 in graph 404 of FIGS. 4A-4B. Other method may also be utilized to determine the gains at different subbands based on the gains across the frequency range.

In some embodiments, to enable subband-based CSI reporting, part of the subband information, instead of all the subband information is determined and transmitted in the report. For example, if there are two or more beams selected (for example, L beams), the terminal device 120 may further determine fifth indication information indicating gains of at least one beam in the subset of beams at a subset of the plurality of frequency locations. For example, one or more strongest beams (for example, Lsb) are selected from L beams and their subband-based gains can be determined as the fifth indication information. In some embodiments, the plurality of frequency locations in the frequency range may be divided into two or more subsets. The strongest beams are searched in each of the subsets.

The fifth indication information may be regarded as the subband PMI, represented as $p_{l,i}^{(2)}$. By transmitting less subband gains, the overhead of the CSI may also be decreased. The fifth indication information may be reported in the second part of the CSI report.

Figure 5:
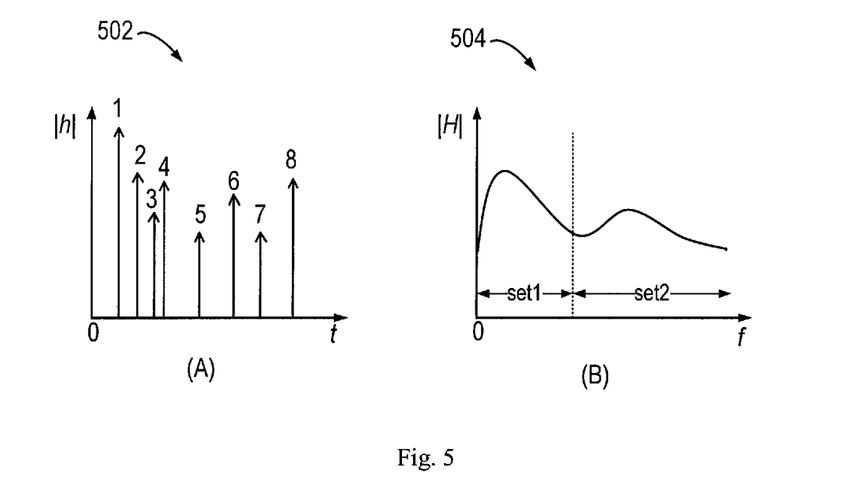
FIGS. 5A-5B illustrate graphs of time-domain responses of beams according to some other embodiments of the present disclosure.

As an example, in FIGS. 5A-5B, graph 502 shows eight beams distributed in a time domain with different delay values, and graph 504 shows the frequency-domain response.

According to the strength of the frequency-domain response, beams 1, 2, 4, and 8 are selected in the first set (set1) of frequency locations and their corresponding gains at these frequency locations may be determined and included in the fifth indication. In addition, in the second set (set2) of frequency locations, beams 1, 2, 7, and 8 are selected and their corresponding gains at these frequency locations may be determined and included in the fifth indication.

In some embodiments, instead of including the fourth indication information for all the beams and at all the frequency locations, the CSI report may include sixth indication information indicating respective co-phasing shifts of the at least one stronger beam at the subset of frequency locations. In the example of FIGS. 5A-5B, the fourth indication information may indicate co-phasing shifts of beams 1, 2, 4, and 8 at the first set of frequency locations in, and indicate co-phasing shifts of beams 1, 2, 7, and 8 at the second set of frequency. By transmitting less subband co-phasing shifts, the overhead of the CSI may be further decreased. The sixth indication information may also be reported in the second part of the CSI report.

In some embodiments, the CSI report may further comprise further indication information indicating a channel quality indicator (CQI) corresponding to the frequency range or respective CQIs corresponding to the plurality of frequency locations. The CQI-related information may be included in the first part of the CSI report.

In some embodiments, to transmit the delay value $\tau_i$ in the CSI transmission by the terminal device 120, the delay value in the second indication information may be quantized into a number of bits. To ensure the accuracy as well as avoid using too much bits to increase the overhead, some embodiments of the quantization for the delay value are discussed below. Other information in the CSI report may be quantized using any currently existing methods or any other methods that will be developed.

In some embodiments, the terminal device 120 may use a non-uniform quantization for the delay value $\tau_i$. In one embodiment, for each delay value for a selected beam the terminal device 120 may determine, based on the delay value $\tau_i$, a first number of bits for quantization of the delay value, the first number being larger than the number of bits determined for a further delay value with a smaller magnitude. For example, if a delay value is to be ranged from 0 to X, the lower the magnitude of the delay value $\tau_i$ is, the higher the first number is, and the higher the magnitude of the delay value $\tau_i$, the smaller the first number is. In this way, the small delay value $\tau_i$ may be quantized with more bits to improve the transmission accuracy and resolution relative to other small delay value. The following Table 2 provides an example how the delay values with different values are quantized. In this example, a delay value can have a value ranged from 0 to 144. It would be appreciated that Table 2 is provided for purpose of illustration only and other quantization methods are also appreciated.

TABLE 2

Quantization of delay values based on their magnitudes

| Delay value | step-size | # of states |
|---|---|---|
| 0-15 | 2 | 8 |
| 16-47 | 4 | 8 |
| 47-95 | 6 | 8 |
| 96-143 | 8 | 8 |

In a further embodiment, for each delay value for a selected beam the terminal device 120 may determine, based on a gain of the at least one selected beam, a second number of bits for quantization of the delay value, the second number being larger than the number of bits determined for a further delay value corresponding to a further beam with a higher gain. All the selected beams may be ranked according to their gains. In some examples, the first beam in the time domain has the highest gain, and thus a number of delay values (for example, K) for the first K beams may be allocated with a large number of bits, while the remaining delay values may be allocated with a smaller number of bits. The following Table 3 provides another example how different delay value are quantized.

It would be appreciated that Table 3 is provided for purpose of illustration only and other quantization methods are also appreciated.

TABLE 3

Quantization of delay values based on their magnitudes

| Order of gains | Bits for delay value |
|---|---|
| 1$^{st}$-Kth gains | 5 |
| Remaining gains | 3 |

Figure 6:
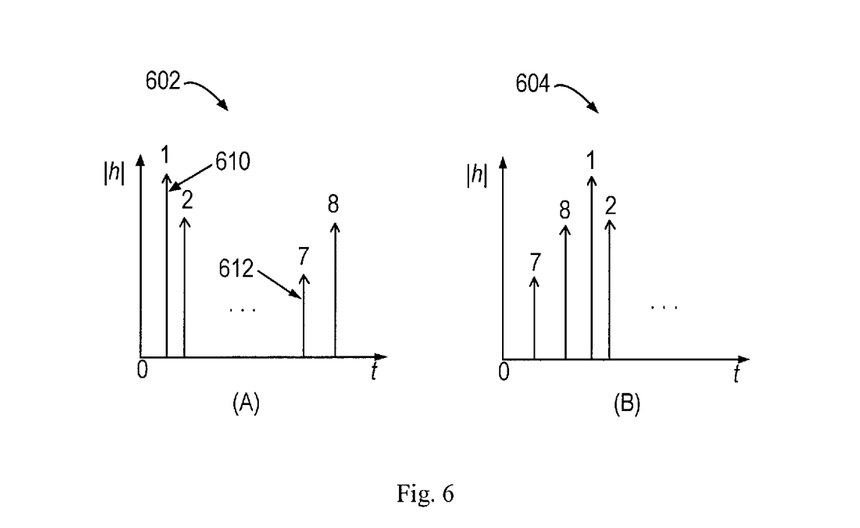
FIGS. 6A-6B illustrate graphs of time-domain responses of beams according to some other embodiments of the present disclosure.

In some embodiments, the first beam may not be the strongest beam (not have the highest gain) due to the synchronization procedure. For example, graph 602 of FIGS. 6A-6B show the time-domain responses of different delay values in the time domain, where the first beam corresponding to the response 610 is the synchronized first beam, while the seventh beam corresponding to the response 612 is the actual first beam with the smallest actual delay values. In these embodiments, for each delay value, the terminal device 120 may modify the delay value by shifting the delay value with a cyclic-shift value to obtain a cyclic-shifted version of the delay value. The cyclic-shift value may be configured by the network device 110. As show in graph 604 of FIGS. 6A-6B, after cyclic shifting, the seventh beam, which is the actual first beam with the smallest gain, is shifted to be the first one and all the beams are gathered together to a specific time range. The terminal device 120 may then determine the second number of bits based on the gain of the cyclic-shifted version of the delay value.

Upon determining the number of the bits for quantization, the terminal device 120 may quantize the delay value into the first number of bits (in the embodiments of magnitude-based quantization) or into the second number of bits (in the embodiments of gain-based quantization). In some embodiments, if the second number of bits is determined based on the cyclic-shifted version of the delay value, the terminal device 120 may quantize the cyclic-shifted version of the delay value into the second number of bits.

In the above embodiments, the frequency-related information is included in the CSI report as separate information (i.e., $\tau_i$). In some other embodiments, the frequency-related information may be communicated in a more implicit manner with the indication information for the selected beam(s). Such embodiments will be described below with reference to FIG. 7, which shows a process 700 for UCI transmission according to an implementation of the present disclosure. For the purpose of discussion, the process 700 will be described with reference to FIG. 1. The process 700 may involve the network device 110 and the terminal device 120 in FIG. 1.

Figure 7:
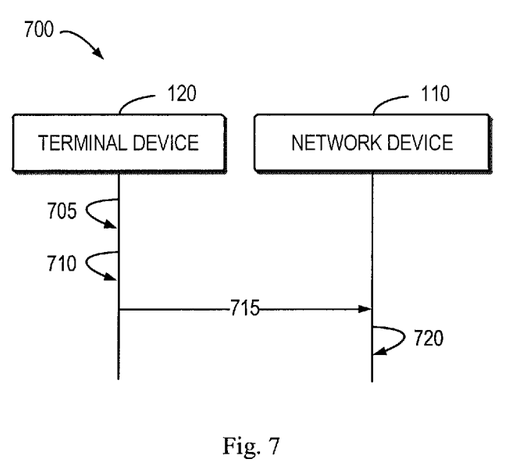
FIG. 7 is a flowchart illustrating a process for CSI transmission according to some further embodiments of the present disclosure.

The terminal device 120 performs (705), a channel estimate between the terminal device 120 and the network device 110 across a predetermined frequency range for a set of beams having different spatial directions. The operation at 705 is similar as the operation at 205, and thus the detailed description is omitted here for brevity.

The terminal device 120 determines (710), based on the channel estimate, indication information indicating at least one beam selected from a plurality of beams for a plurality of frequency locations in the predetermined frequency range. According to the embodiments, the indication information is specific to the beam both in the spatial-related information and the frequency-related information. In other words, the indication information is applied for all frequency locations. In these embodiments, the codebook for the CSI may be redesigned to represent such information. For example, a codeword for CSI can be extended from Equation (2) as below:

$$W^l_{q_1,q_2,n_1,n_2,p_l^{(1)},p_l^{(2)},c_l} = \frac{1}{\sqrt{N_1 N_2 \sum_{k=0}^{2N-1} (p_{l,i}^{(1)} p_{l,i}^{(2)})^2}} \begin{bmatrix} \sum_{i=0}^{L-1} v^{\square}_{m_1^{(i)},m_2^{(i)},f_i} P_{l,i}^{(1)} P_{l,i}^{(2)} \varphi_{l,i} \\ \sum_{i=0}^{L-1} v^{\square}_{m_1^{(i)},m_2^{(i)},f_i} P_{l,i+L}^{(1)} P_{l,i}^{(2)} \varphi_{l,i+L} \end{bmatrix}, l = 1, 2 \quad (5)$$

where $$v^{\square}_{m_1^{(i)},m_2^{(i)},f_i} = v^{\square}_{m_1^{(i)},m_2^{(i)}} \otimes f_i.$$

Upon the channel estimate, the terminal device 120 may determine information for indicating $$v^{\square}_{m_1^{(i)},m_2^{(i)},f_i},$$

which may include determine the indices for the i-th beam, $m_1^{(i)}$ and $m_2^{(i)}$, and the index for the frequency-related information $f_i$. The three indices may be determined as the indication information. The index $f_i$ may be determined in a similar manner as described in the above embodiments of FIG. 2. The index $m_1^{(i)}$ and $m_2^{(i)}$, and the index $f_i$ can be encoded jointly or separately in the report.

The terminal device 120 transmits (715) the indication information to the network device 110 in a first part of a CSI report. Different from the embodiments described with respect to FIG. 2, the indication information indicating the frequency-related information is reported to the network device 110 together with the indication information indicating the selected beam(s).

In addition to the above determined indication information, the CSI report may also include a second part, which may include other information, such as indication information indicating a respective gain in the time domain for the at least one selected beam applied across the predetermined frequency range, indication information indicating a respective co-phasing shift in the time domain for the at least one selected beam applied across the predetermined frequency range, indication information indicating a gain of at least one beam in the subset of beams at at least one of the plurality of frequency locations, and/or indication information indicating a respective co-phasing shift in the time domain for the at least one beam in the subset of beams at the at least one frequency location.

Figure 2:
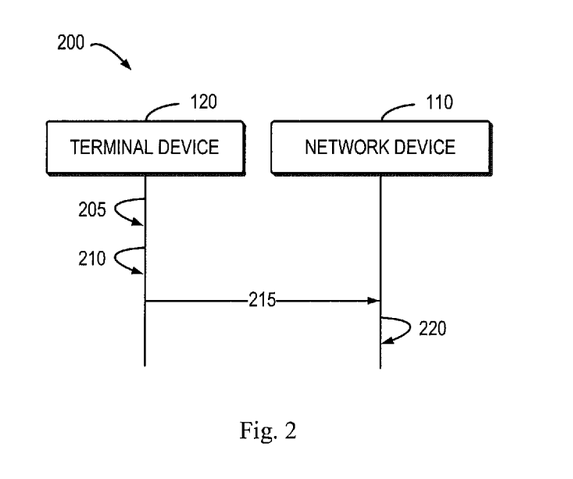
FIG. 2 is a flowchart illustrating a process for channel state information (CSI) transmission according to some embodiments of the present disclosure.

Such indication information may be similar as those described in the above embodiments of FIG. 2. In some embodiments, the first part of the CSI report may further include channel quality indicator (CQI) corresponding to the wideband or respective CQIs corresponding to the plurality of frequency locations. The first part may be first transmitted to the network device 110, followed by the second part.

Upon reception of the CSI report, the network device 110 constructs (720) CSI based on the received indication information. For example, the network device 110 determines a codeword from a CSI codebook based on the received indication information to control transmission with the terminal device 120.

Figure 8:
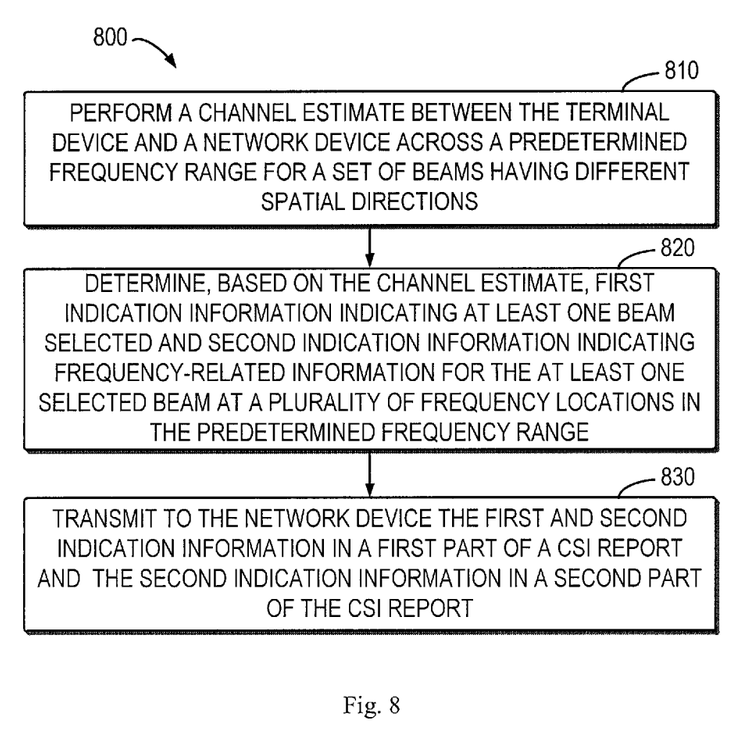
FIG. 8 shows a flowchart of an example method in accordance with some embodiments of the present disclosure.

FIG. 8 shows a flowchart of an example method 800 in accordance with some embodiments of the present disclosure. The method 800 can be implemented at a terminal device 120 as shown in FIG. 1. For the purpose of discussion, the method 900 will be described from the perspective of the terminal device 120 with reference to FIG. 1.

At block 810, the terminal device 120 performs a channel estimate between the terminal device and a network device across a predetermined frequency range for a set of beams having different spatial directions. At block 820, the terminal device 120 determines, based on the channel estimate, first indication information indicating at least one beam selected from the set of beams and second indication information indicating frequency-related information for the at least one selected beam at a plurality of frequency locations in the predetermined frequency range. At block 830, the terminal device 120 transmits to the network device the first indication information in a first part of a channel state information (CSI) report and the second indication information in a second part of the CSI report.

In some embodiments, determining the second indication information comprises: determining at least one delay value associated with the at least one selected beam in a time domain applied across the predetermined frequency range as the second indication information, the frequency-related information for each selected beam being indicated by a combination of the associated delay value and predefined indices of the plurality of frequency locations.

In some embodiments, the plurality of frequency locations are configured by the network device.

In some embodiments, the method further comprises determining, based on the channel estimate, third indication information indicating a respective gain in a time domain for the at least one selected beam applied across the predetermined frequency range and fourth indication information indicating a respective co-phasing shift in the time domain for the at least one selected beam applied across the predetermined frequency range; and transmitting to the network device the third and fourth indication information in the second part of the CSI report.

In some embodiments, the first indication information indicating a subset of beams selected from the set of beams, the subset of beams comprising two or more beams, and the method further comprising: determining, based on the channel estimate, fifth indication information indicating gains of at least one beam in the subset of beams at a subset of the plurality of frequency locations, the at least one beam being stronger than other beams in the subset of beams; and transmitting to the network device the fifth indication information in the second part of the CSI report.

In some embodiments, the method further comprises determining, based on the channel estimate, sixth indication information indicating respective co-phasing shifts of the at least one beam in the subset of beams at the at least one frequency location; and transmitting to the network device the sixth indication information in the second part of the CSI report.

In some embodiments, the first part of the CSI report further comprises further indication information indicating a channel quality indicator (CQI) corresponding to the frequency range or respective CQIs corresponding to the plurality of frequency locations.

In some embodiments, the transmitting comprises: for each of the at least one delay value, determining, based on a magnitude of the delay value, a first number of bits for quantization of the delay value, the first number being larger than the number of bits determined for a further delay value with a smaller magnitude; quantizing the delay value into the first number of bits; and transmitting the first number of bits to the network device.

In some embodiments, the transmitting comprises: for each of the at least one beam, determining, based on a gain of the at least one selected beam, a second number of bits for quantization of the delay value, the second number being larger than the number of bits determined for a further delay value corresponding to a further beam with a higher gain; quantizing the delay value into the second number of bits; and transmitting the second number of bits to the network device.

In some embodiments, determining the second number of bits comprises: modifying the delay value by shifting the delay value with a cyclic-shift value to obtain a cyclic-shifted version of the delay value; and determining the second number of bits based on the gain of the cyclic-shifted version of the delay value. Quantizing the delay value comprises quantizing the cyclic-shifted version of the delay value.

In some embodiments, the predetermined frequency range has a system bandwidth.

In some embodiments, the second part is transmitted to the network device after the first part is transmitted.

Figure 9:
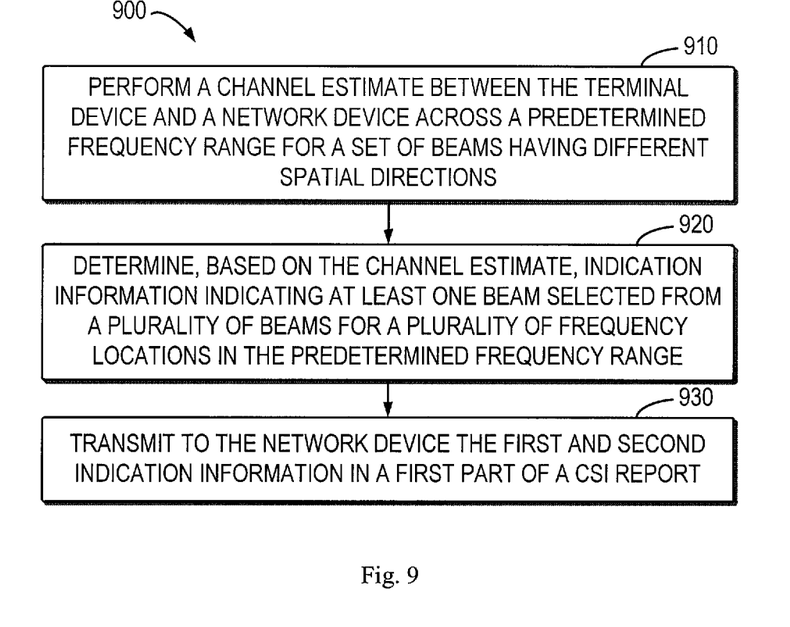
FIG. 9 shows a flowchart of an example method in accordance with some other embodiments of the present disclosure.

FIG. 9 shows a flowchart of an example method 900 in accordance with some other embodiments of the present disclosure. The method 900 can be implemented at a terminal device 120 as shown in FIG. 1. For the purpose of discussion, the method 900 will be described from the perspective of the terminal device 120 with reference to FIG. 1.

At block 910, the terminal device 120 performs a channel estimate between the terminal device and a network device across a predetermined frequency range for a set of beams having different spatial directions. At block 920, the terminal device 120 determine, based on the channel estimate, indication information indicating at least one beam selected from a plurality of beams for a plurality of frequency locations in the predetermined frequency range. At block 930, the terminal device 120 transmits to the network device the indication information in a first part of a channel state information (CSI) report.

In some embodiments, the indication information includes an index for defining a codeword in a codebook configured for the CSI.

In some embodiments, the method further comprises determining, based on the channel estimate, further indication information indicating at least one of: a respective gain in a time domain for the at least one selected beam across the predetermined frequency range, a respective co-phasing shift in the time domain for the at least one selected beam applied across the predetermined frequency range; and transmitting to the network device the indication information in a second part of the CSI report, the second part being transmitted to the network device after the first part is transmitted.

Figure 10:
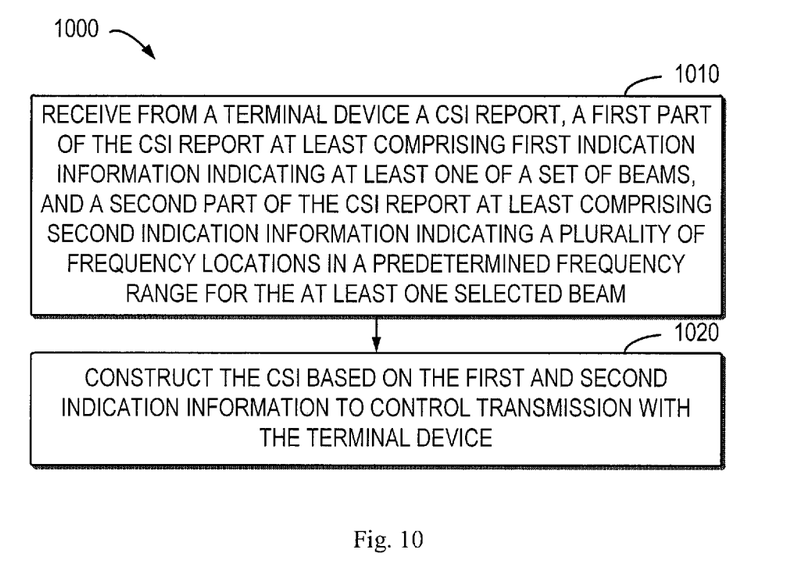
FIG. 10 shows a flowchart of an example method in accordance with some further embodiments of the present disclosure.

FIG. 10 shows a flowchart of an example method 1000 in accordance with some further embodiments of the present disclosure. The method 1000 can be implemented at a network device 110 as shown in FIG. 1. For the purpose of discussion, the method 1000 will be described from the perspective of the terminal device 120 with reference to FIG. 1.

At block 1010, the network device 110 receives from a terminal device a channel state information (CSI) report determined from a channel estimate, a first part of the CSI report at least comprising first indication information indicating at least one of a set of beams, and a second part of the CSI report at least comprising second indication information indicating a plurality of frequency locations in a predetermined frequency range for the at least one selected beam. At block 1020, the network device 110 constructs CSI based on the first and second indication information to control transmission with the terminal device.

In some embodiments, the second indication information includes at least one delay value associated with the at least one selected beam in a time domain applied across the predetermined frequency range as the second indication information, constructing the CSI comprising: determining the frequency-related information for each selected beam by a combination of the associated delay value and predefined indices of the plurality of frequency locations.

In some embodiments, the plurality of frequency locations are configured by the network device.

In some embodiments, the second part of the CSI report comprises third indication information indicating a respective gain in a time domain for the at least one selected beam applied across the predetermined frequency range and fourth indication information indicating a respective co-phasing shift in the time domain for the at least one selected beam applied across the predetermined frequency range, the method further comprising: determining respective gains for the at least one selected beam at the plurality of frequency locations by weighting the second, third, and fourth indication information.

In some embodiments, the first indication information indicating a subset of beams selected from the set of beams, the subset of beams comprising two or more beams, and the second part of the CSI report further comprises fifth indication information indicating gains of at least one beam in the subset of beams at a subset of the plurality of frequency locations, the at least one beam being stronger than other beams in the subset of beams.

In some embodiments, the second part of the CSI report further comprises sixth indication information indicating respective co-phasing shifts of the at least one beam in the subset of beams at the at least one frequency location.

In some embodiments, the first part of the CSI report further comprises further indication information indicating a channel quality indicator (CQI) corresponding to the frequency range or respective CQIs corresponding to the plurality of frequency locations.

In some embodiments, constructing the CSI comprises: determining, based on the first and second indication information, a codeword from a codebook configured for the CSI.

In some embodiments, the second part is received by the network device after the first part is received.

Figure 11:
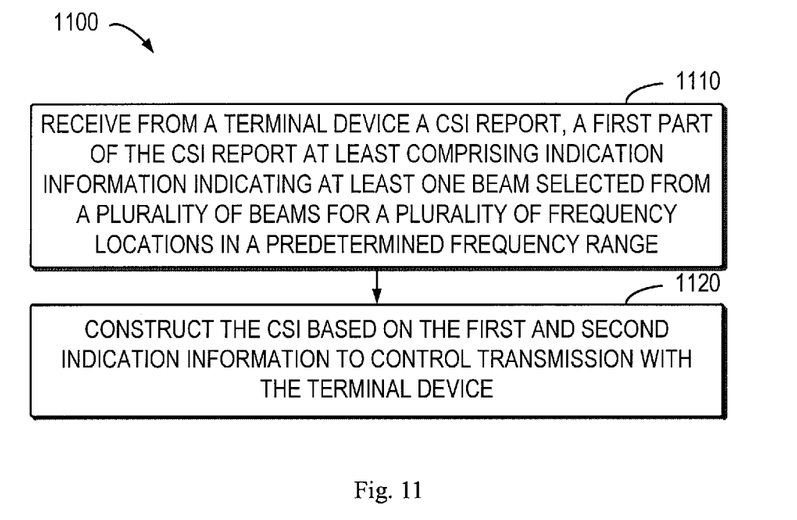
FIG. 11 shows a flowchart of an example method in accordance with some other yet further embodiments of the present disclosure.

FIG. 11 shows a flowchart of an example method 1100 in accordance with some yet further embodiments of the present disclosure. The method 1100 can be implemented at a network device 110 as shown in FIG. 1. For the purpose of discussion, the method 1000 will be described from the perspective of the terminal device 120 with reference to FIG. 1.

At block 1110, the network device 110 receives from a terminal device a channel state information (CSI) report determined from a channel estimate, a first part of the CSI report at least comprising indication information indicating at least one beam selected from a plurality of beams for a plurality of frequency locations in a predetermined frequency range. At block 1220, the network device 110 constructs CSI based on the first and second indication information to control transmission with the terminal device.

In some embodiments, the indication information includes an index for defining a codeword in a codebook configured for the CSI.

In some embodiments, a second part of the CSI report comprise further indication information indicating at least one of: a respective gain in a time domain for the at least one selected beam across the predetermined frequency range, a respective co-phasing shift in the time domain for the at least one selected beam applied across the predetermined frequency range. The second part is received by the network device after the first part is received.

Figure 12:
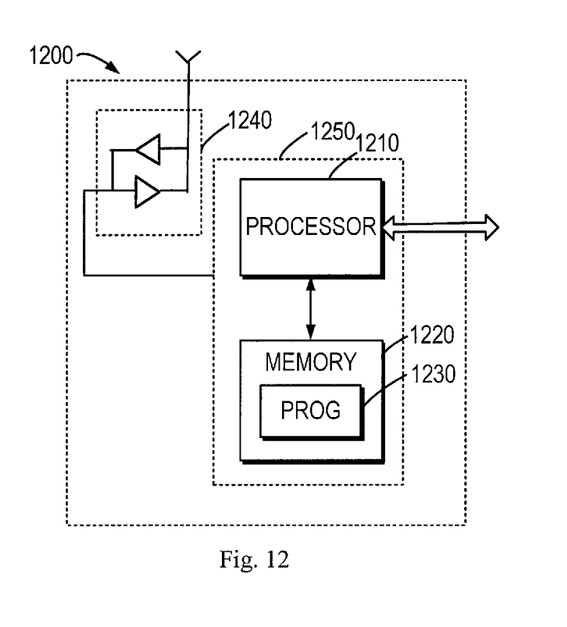
FIG. 12 is a simplified block diagram of a device that is suitable for implementing embodiments of the present disclosure.

FIG. 12 is a simplified block diagram of a device 1200 that is suitable for implementing embodiments of the present disclosure. The device 1200 can be considered as a further example implementation of a network device 110 or a terminal device 120 as shown in FIG. 1. Accordingly, the device 1200 can be implemented at or as at least a part of the network device 110 or the terminal device 120.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1210 stores at least a part of a program 1230. The TX/RX 1240 is for bidirectional communications. The TX/RX 1240 has at least one antenna to facilitate communication, though in practice an Access Node mentioned in this application may have several ones.

The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1230 is assumed to include program instructions that, when executed by the associated processor 1210, enable the device 1200 to operate in accordance with the embodiments of the present disclosure, as discussed herein with reference to FIGS. 2 to 4 and FIGS. 9 to 12. The embodiments herein may be implemented by computer software executable by the processor 1210 of the device 1200, or by hardware, or by a combination of software and hardware. The processor 1210 may be configured to implement various embodiments of the present disclosure. Furthermore, a combination of the processor 1210 and memory 1210 may form processing means 1250 adapted to implement various embodiments of the present disclosure.

The memory 1210 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1210 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 11 Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a terminal device, comprising:
    performing a channel estimate between the terminal device and a network device across a predetermined frequency range for a set of beams having different spatial directions;
    determining, based on the channel estimate, first indication information indicating at least one beam selected from the set of beams and second indication information indicating frequency-related information for the at least one selected beam at a plurality of frequency locations in the predetermined frequency range;
    transmitting to the network device the first indication information in a first part of a channel state information (CSI) report and the second indication information in a second part of the CSI report;
    determining, based on the channel estimate, third indication information indicating a respective gain in a time domain for the at least one selected beam applied across the predetermined frequency range and fourth indication information indicating a respective co-phasing shift in the time domain for the at least one selected beam applied across the predetermined frequency range; and
    transmitting to the network device the third and fourth indication information in the second part of CSI report.

2. The method of claim 1, wherein determining the second indication information comprises:
    determining at least one delay value associated with the at least one selected beam in a time domain applied across the predetermined frequency range as the second indication information, the frequency-related information for each selected beam being indicated by a combination of the associated delay value and predefined indices of the plurality of frequency locations.

3. The method of claim 2, wherein the transmitting comprises: for each of the at least one delay value,
determining, based on a magnitude of the delay value, a first number of bits for quantization of the delay value, the first number being larger than the number of bits determined for a further delay value with a smaller magnitude;
quantizing the delay value into the first number of bits; and
transmitting the first number of bits to the network device.

4. The method of claim 2, wherein the transmitting comprises: for each of the at least one beam,
determining, based on a gain of the at least one selected beam, a second number of bits for quantization of the delay value, the second number being larger than the number of bits determined for a further delay value corresponding to a further beam with a higher gain;
quantizing the delay value into the second number of bits; and
transmitting the second number of bits to the network device.

5. The method of claim 4, wherein determining the second number of bits comprises:
modifying the delay value by shifting the delay value with a cyclic-shift value to obtain a cyclic-shifted version of the delay value; and
determining the second number of bits based on the gain of the cyclic-shifted version of the delay value, and
wherein quantizing the delay value comprises quantizing the cyclic-shifted version of the delay value.

6. The method of claim 1, wherein the plurality of frequency locations are configured by the network device.

7. The method of claim 1, wherein the first indication information indicating a subset of beams selected from the set of beams, the subset of beams comprising two or more beams, and the method further comprising:
determining, based on the channel estimate, fifth indication information indicating gains of at least one beam in the subset of beams at a subset of the plurality of frequency locations, the at least one beam being stronger than other beams in the subset of beams; and
transmitting to the network device the fifth indication information in the second part of the CSI report.

8. The method of claim 7, further comprising:
determining, based on the channel estimate, sixth indication information indicating respective co-phasing shifts of the at least one beam in the subset of beams at the at least one frequency location; and
transmitting to the network device the sixth indication information in the second part of report of CSI.

9. The method of claim 1, wherein the first part of the CSI report further comprises further indication information indicating a channel quality indicator (CQI) corresponding to the frequency range or respective CQIs corresponding to the plurality of frequency locations.

10. The method of claim 1, wherein the predetermined frequency range has a wideband.

11. The method of claim 1, wherein the second part is transmitted to the network device after the first part is transmitted.

12. A method implemented in a terminal device, comprising:
performing a channel estimate between the terminal device and a network device across a predetermined frequency range for a set of beams having different spatial directions;
determining, based on the channel estimate, indication information indicating at least one beam selected from a plurality of beams for a plurality of frequency locations in the predetermined frequency range;
transmitting to the network device the indication information in a first part of a channel state information (CSI) report,
determining, based on the channel estimate, further indication information indicating at least one of: a respective gain in a time domain for the at least one selected beam applied across the predetermined frequency range, a respective co-phasing shift in the time domain for the at least one selected beam applied across the predetermined frequency range; and
transmitting to the network device the indication information in a second part of the CSI report, the second part being transmitted to the network device after the first part is transmitted.

13. The method of claim 12, wherein the indication information includes an index for defining a codeword in a codebook configured for the CSI.

14. A method implemented in a network device, comprising:
receiving from a terminal device a channel state information (CSI) report determined from a channel estimate, a first part of the CSI report at least comprising first indication information indicating at least one of a set of beams, and a second part of the CSI report at least comprising second indication information indicating a plurality of frequency locations in a predetermined frequency range for the at least one selected beam; and
constructing CSI based on the first and second indication information to control transmission with the terminal device,
wherein the second part of the CSI report comprises third indication information indicating a respective gain in a time domain for the at least one selected beam applied across the predetermined frequency range and fourth indication information indicating a respective co-phasing shift in the time domain for the at least one selected beam applied across the predetermined frequency range, the method further comprising:
determining respective gains for the at least one selected beam at the plurality of frequency locations by weighting the second, third, and fourth indication information.

15. The method of claim 14, wherein the second indication information includes at least one delay value associated with the at least one selected beam in a time domain applied across the predetermined frequency range as the second indication information, constructing the CSI comprising:
determining the frequency-related information for each selected beam by a combination of the associated delay value and predefined indices of the plurality of frequency locations.

16. The method of claim 14, wherein the first indication information indicating a subset of beams selected from the set of beams, the subset of beams comprising two or more beams, and the second part of the CSI report further comprises fifth indication information indicating gains of at least one beam in the subset of beams at a subset of the plurality of frequency locations, the at least one beam being stronger than other beams in the subset of beams, and wherein the second part of the CSI report further comprises sixth indication information indicating respective co-phasing shifts of the at least one beam in the subset of beams at the at least one frequency location, and wherein the first part of the CSI report further comprises further indication information indicating a channel quality indicator (CQI) corresponding to the frequency range or respective CQIs corresponding to the plurality of frequency locations.

17. A method implemented in a network device, comprising:

receiving from a terminal device a channel state information (CSI) report determined from a channel estimate, a first part of the CSI report at least comprising indication information indicating at least one beam selected from a plurality of beams for a plurality of frequency locations in a predetermined frequency range; and constructing CSI based on the indication information to control transmission with the terminal device, wherein the second part of the CSI report comprises third indication information indicating a respective gain in a time domain for the at least one selected beam applied across the predetermined frequency range and fourth indication information indicating a respective co-phasing shift in the time domain for the at least one selected beam applied across the predetermined frequency range, the method further comprising:

determining respective gains for the at least one selected beam at the plurality of frequency locations by weighting the second, third, and fourth indication information.

* * * * *